United States Patent [19]
Casey

[11] Patent Number: 6,078,282
[45] Date of Patent: Jun. 20, 2000

[54] DATA BASE FOR A LOCATOR SYSTEM

[76] Inventor: Paul J. Casey, 233 Paddock Cir., West Powell, Ohio 43063

[21] Appl. No.: 09/105,954

[22] Filed: Jun. 26, 1998

Related U.S. Application Data

[60] Provisional application No. 60/051,305, Jun. 30, 1997.

[51] Int. Cl.[7] .................................................. G01S 5/02
[52] U.S. Cl. ........................... 342/357.06; 342/357.13; 701/208
[58] Field of Search ................... 342/357.01, 357.13, 342/357.06; 340/988, 989, 990, 825.54; 701/208

[56] References Cited

U.S. PATENT DOCUMENTS

| | | | |
|---|---|---|---|
| 4,275,385 | 6/1981 | White | 340/312 |
| 5,334,974 | 8/1994 | Simms et al. | 340/990 |
| 5,396,227 | 3/1995 | Carroll et al. | 340/825.31 |
| 5,461,390 | 10/1995 | Hoshen | 342/419 |
| 5,939,975 | 8/1999 | Tsuria et al. | 340/426 |

*Primary Examiner*—Thomas H. Tarcza
*Assistant Examiner*—Dao L. Pham
*Attorney, Agent, or Firm*—Vytas R. Matas

[57] ABSTRACT

A locator system for quickly disseminating stored information about the lost person or item utilizes input data in text, pictorial and video form which is selectively sent to facilities that can use the information (text, pictorial and video to TV stations; text and pictorial to police; text to radio; text and pictorial to the internet). The system also utilizes a GPS system and a receiver on the person or item to be located to aid the police in finding the location of the person or item.

17 Claims, 3 Drawing Sheets

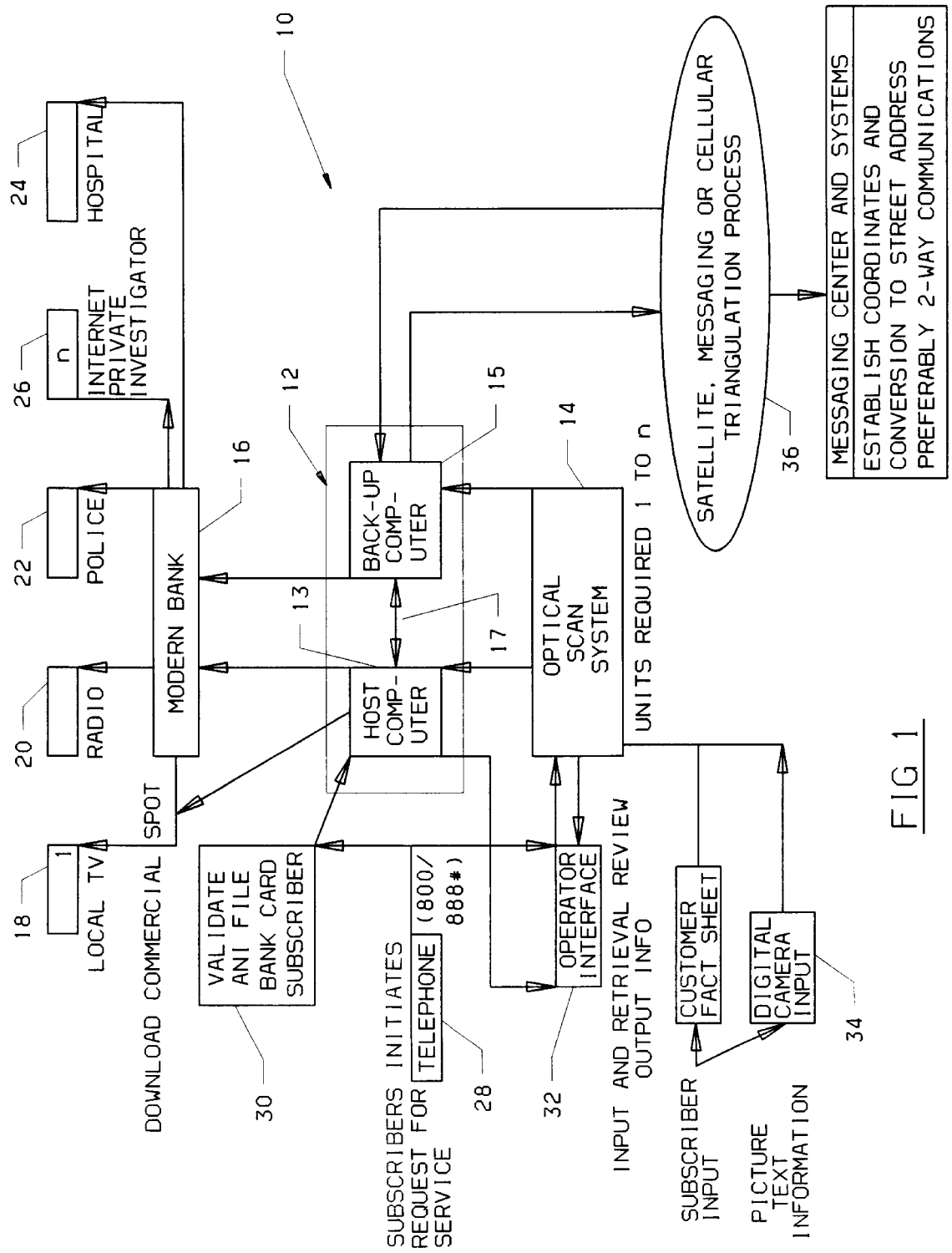

PMC FIRST SEARCH
LOCATOR SYSTEM APPLICATION FORM

```
                    LAST NAME         FIRST      MIDDLE I     SS NUMBER
CLIENT              _____       _____     _____      _____
PARENT/GUARD        _____       _____     _____      (RESIDENT PARENT)
RESIDENCE/ADDRESS
STREET              _____             APPT NO. _____
CITY                _____ STATE _____  ZIP CODE _____
COUNTY              _____
OTHER PARENT        _____       _____     _____
ADDRESS IF NOT SAME AS ABOVE:
STREET              _____             APPT NO. _____
CITY                _____ STATE _____  ZIP CODE _____
TELEPHONE NO.   MOTHER          FATHER              OTHER _____
HOME            (   ) _____   (   ) _____       (   ) _____
WORK            (   ) _____   (   ) _____       (   ) _____
NEAREST NON-RESIDENT RELATIVE NAME _____
NEAREST NON-RESIDENT RELATIVE PHONE NO. _____
CLIENTS VITAL STATISTICS:
RACE _____ SEX _____ AGE _____ HEIGHT _____ WEIGHT _____
HAIR COLOR _____ EYE COLOR _____ BIRTHMARKS/SCARS _____
MOTHERS MAIDEN NAME OR OTHER KEYWORD _____
BEST FRIENDS NAME _____ TELEPHONE NO. _____
PET(S) NAME _____ TYPE _____ FAVORITE TOY/ITEM _____

REQUESTED DISTRIBUTION LIST: _____
                               TELEPHONE NO.     FAX NO. (IF AVAIL)
POLICE    _____           (  ) _____      (  ) _____
SHERIFF   _____           (  ) _____      (  ) _____
HOSPITAL  _____           (  ) _____      (  ) _____
SCHOOL    _____           (  ) _____      (  ) _____
OTHER     _____           (  ) _____      (  ) _____
```

MEDICAL AND OTHER INFORMATION:          BLOOD TYPE:
_____
_____
_____

HAS THIS PERSON BEEN MISSING BEFORE?
IF YES, WHERE FOUND:

I HEREBY RECOGNIZE AND ACKNOWLEDGE THE SERIOUS NATURE OF THIS EMERGENCY SYSYEM. I FURTHER ACKNOWLEDGE THAT I WILL BE PERSONALLY RESPONSIBLE FOR ANY MISUSE OR INCONVENIENCE TO LAW ENFORCEMENT OR OTHER AGENCIES AND THE COST THAT MAY BE INCURRED FOR ABUSE OF THIS SERVICE. I FURTHER RELEASE PWC ENTERPRISE INC. ITS BOARD OF DIRECTORS AND OFFICERS OF ALL LIABILITY ASSOCIATED WITH THE USE OF THIS SERVICE. I HAVE READ THE REVERSE SIDE AND AGREE TO SLATED TERMS AND CONDITIONS.

PARENT/GUARDIAN: _____     DATE: _____
PAYMENT: V/MC/CHECK   CARD NO. _____   EXP DT: _____  SIGNATURE _____
OFFICE USE ONLY
CUSTOMER NO. _____ SALESMAN _____ AFFINITY _____ ACTIVATION DT _____

FIG 2

```
PMC-FIRST SEARCH          MISSING PERSON ALERT
```

| | | |
|---|---|---|
| LAST NAME: | FIRST NAME: | MID NAME: |
| NICKNAME: | GEOGRAPHIC AREA: | DIRECTION HEADED: |
| MISSING FROM: | POWELL, OHIO | BACK YARD, LAST SEEN |
|   POWELL, OHIO | OLENTANGY RIDGE | TALKING TO NEIGHBORS |

LAST SEEN INFORMATION:
 LAST DATE: 06-19-1998
 LAST TIME: 11:27 AM
 SHIRT/BLOUSE: BLUE GOLF SHIRT
 PANTS/SKIRT: TAN SLACKS-DOCKERS
 SHOES: BLACK LOAFERS
 SWEATER: NONE
 TIE/HAT: TAN BASEBALL HAT
 OVERCOAT: NONE
 OTHER:
 TENDS TO WHISTLE WHILE WALKING
 WALKS AT A BRISK PACE
ADDITIONAL INFORMATION:
 HAS "MONK" BALD SPOT. MOLE ON
 LEFT CHEEK REMOVED SINCE
 PICTURE WAS TAKEN.

PHOTOGRAPH

HISTORY OF MISSING OR RUNAWAY:
 ALZHEIMERS PATIENT. KNOWN TO GET LOST OCCASIONALLY.
 ILLUSTRATION PUPPOSES ONLY!. DATA FILES INDICATES THAT HE
 HAS BEEN FOUND ON MAIN STREET SEVERAL TIMES. ILLUSTRATION
 PURPOSES ONLY!!!.
PERSONAL INFORMATION:

| | | | |
|---|---|---|---|
|   RACE: | W | WEIGHT: | 175 |
|   SEX: | M | EYE COLOR: | HAZEL AND BROWN |
|   AGE: | 53 | HAIR COLOR: | BROWN |
|   HEIGHT: | 5'-9" | BLOOD TYPE: | O NEGATIVE |

DISTINGUISHING MARKS: TEETH HAVE BEEN WHITENED AND HAS A
SMALL GAP NEXT TO LOWER LEFT CANINE.
OFFICIAL POLICE REPORT NO.: FOR ILLUSTRATION ONLY
POLICE REPORT DATE: 5/18/98 7:45:00 PM
POLICE DEPT NAME: COLUMBUS POLICE
POLICE CONTACT NAME: DETECTIVE
POLICE CONTACT NO.: 614-XXX-XXXX
DATE REPORTED: 05-18-1998          TIME REPORTED: 8:00 PM
REPORTING NAME: PAUL CASEY
REPORTING ADDRESS: 233 PADDOCK CIRCLE,POWELL,OHIO 43065
REPORTING RELATIONSHIP: CARETAKER
REPORTING PHONE NO.: 814-847-1935
FIRST SEARCH CUSTOMER REPRESENTATIVE: LEW CROWELL
FIRST SEARCH TELEPHONE NO.: 814-847-1935
CUSTOMER NO.: 1          #NAME?

FIG 3

DATA BASE FOR A LOCATOR SYSTEM

This application claims benefit of provisional application Ser. No 60/051,385 filed Jun. 30, 1997.

BACKGROUND OF THE INVENTION

1. Field of the Invention

The present invention generally relates to systems for locating missing or lost individuals or items and particularly to computerized systems for same.

2. Description of the Prior Art

Presently there are a number of systems, which aid in locating last individuals such as children and reuniting them with their parents. These systems are both mechanical as well as electronic.

One such mechanical system is described in U.S. Pat. No. 5,195,783.

This system includes a shoelace, near the center of which is affixed a flexible strip, made from textile, plastic, or other suitable material, that is adapted to be wrapped about the shoelace and retained in that position. Desired information, such as name, address, telephone number, blood type, medical facts of special concern, or the like, may appear on the surface of the strip which is to be concealed by the strip having been overlaid by itself as it is wrapped about the shoelace. A protective cover material, such as a short, tubular segment of clear plastic, to protect the strip while keeping the distinguishing indicia visible may surround the strip, so marked and so positioned. Such protective cover and/or the surface of the strip, which is exposed when the strip is so wrapped, may include distinguishing indicia to notify interested persons, such as police, medical workers, etc., of the existence of the enclosed information. Thereby, the identification of a lost child, or information relevant to treating a person in medical emergency may be identified as being available and made easily accessible when needed, while being concealed until then.

While useful, the system depends upon the data in the child's shoestrings being discovered and used. Also, the data information would be useless in locating the child if he is held against his will by kidnappers.

Another system, described in U.S. Pat. No. 4,650,219, facilitates notification of the parents of a lost child, while preventing strangers from learning the name of the child or parents. The system includes an alphanumeric identification making (I.D. marking) on an item of clothing of a particular child, the I.D. marking being unique to the particular child but not containing the child's name. An alert marking, similar to alert markings on other children's clothing that have an I.D. marking, alerts authorities who find a lost child that an I.D. marking is present and indicates where it is located, such as hidden within a pocket. Authorities finding the child and by the alert marking are directed to the I.D. marking, are able to contact a central station which can notify the parents of the child that the child has been found. The I.D. marking can be generated from a credit card number of a parent by a formula that permits knowledge of the I.D. marking to be used to generate enough of the credit card number of the parent to identify him or her.

Again, as in the previous system, there is no incentive for kidnappers to determine the child's identity or inform the parents and this system is useless in locating a child being held against his will.

An electronic locator system is described in U.S. Pat. No. 5,021,794, which is activated by someone other than the lost person or item. More specifically, a radio transmitter in a miniaturized transceiver is concealed on a person to be located, such as a lost child, is activated and transmits a coded UHF radio homing signal upon receipt of an initiating signal containing the child's address code. The initiating signal is automatically transmitted by a repeater station in response to an audible "panic signal" containing the address code and contains the identical address code. The panic signal is a pulse tone produced by a hand held tone generator activated by the child's parent and is transmitted to the repeater station by telephone. Tracing vehicles are provided with automatic UHF radio direction finding and distance measuring equipment for locating the source of the homing signal. Stored information concerning the child can be transmitted to the tracking vehicles.

This system provides from some storage of information on the person or item lost but the information is transmitted to a, limited number of distributors, namely the tracking vehicle.

In view of the foregoing, the prior art systems lacked a large data base of information on the person or item to be located including pictorial and video information which data base could be updated as needed before the information contained therein would be automatically distributed to a large number of distributors such as TV and radio stations, law enforcement agencies and private investigators.

BRIEF SUMMARY OF THE INVENTION

The present invention solves the problems associated with prior art systems as well as others by providing a system with a large data base having textual, pictorial and video information on a series of registered person and items registered thereon on a nationwide basis. The system involves a registration of the persons or items for which it can be anticipated that a locating search may have to be made by police or others who may need the help of the public who recognize the person or object. Thus, the system is designed for use by those who wish to have information disseminated quickly and widely in the future to help find that which may go astray, such as children, senile persons who lose their bearings, or to quickly locate others who will have an identifying signal transmitters on them.

The system is a nationwide system using a computerized locator system accessible by telephone from anywhere in the nation. This requires dividing the nation into geographical areas or districts to which the locating information is disseminated depending on the origin of the telephone call. Alternatively each geographical district may have a computerized locator system which is capable of communicating with every other computer and/or a central main computer and information to be disseminated in a foreign district may be downloaded directly from each local computer to the foreign district locator system or to the central main computer which may effect the downloading to the foreign local system for dissemination.

In operation the locator system rapidly disseminates identifying information, including real time or current descriptive text, video and pictures, to various selected organizations descriptive and pictorial, to initiate a search for the missing or lost person, animal or item. The information may include other information, such as medical information, which may be helpful or needed when the lost or missing is located.

The locator system of the invention comprises a computer accessible data bank for storing textual and pictorial information of that which is to be located, either currently or perhaps at a future date. A host computer enters and retrieves the information from the data bank. Each person or item has an individual file in the data bank, preferably the file for each comprises two subfiles, one for text material and one for graphics including pictorial information. The computer output includes a multiline modem bank with the computer software selecting which of the modem lines is to be used to disseminate the information about the person to the appropriate organizations for action or further dissemination by the organizations. The locating system includes a triangulating unit to determine the location of the person or item having a coded signal transmitter on the person or item. The triangulating unit maybe of the type utilizing a satellite or other triangulating systems such as those operating in the radio spectrum. For this purpose the software of the computer may have a program which utilizes the triangulating service of the United States Global Positioning System. It will be understood that "computer" as used herein includes, in addition to those mentioned, any conventional accessories of programs necessary to accomplish the computer task described, all within the skill of the ordinary person working in the art.

In view of the foregoing it will be seen that one object of the present invention is to provide a locator system which distributes data on the lost person or item that is textual, pictorial and video and is distributed to various local sources when activated.

Another object is to provide a locator system whose database may be updated for current information prior to dissemination such as the clothing worn and direction headed by the missing person.

Still another object is to provide a locator system that will selectively send data to distributors such as textual and pictorial to law enforcement agencies and video to TV stations as well as the internet.

These and other objects of the present invention will be more fully understood after a review of the description of the preferred embodiment when considered in conjunction with the drawings.

BRIEF DESCRIPTION OF THE DRAWINGS

In the drawings

FIG. 1 is a schematic of the locator system of the present invention.

FIG. 2 is a typical data sheet completed for each person or item registered into the database of the FIG. 1.

FIG. 3 is a typical data sheet completed by the system when a request for service has been made, as an output form, Alert Form, to be disseminated to help locate the missing person or item.

DETAILED DESCRIPTION OF THE PREFERRED EMBODIMENT

Referring now to the drawings wherein the showings are intended to depict a preferred embodiment of the invention and are not intended to limit it thereto, FIG. 1 depicts a schematic of a locator system (10) of the present invention.

The hardware in the locator system (10) are essentially off the shelf items or are readily available components, units or boards, with the software being customized where needed to perform the functions described therein. The customizing of the software is within the skill of those of ordinary skill in the art in light of the disclosure herein and the block diagram attached hereto as FIG. 1. The system (10) has a computer system (12) which has the conventional ability to accept input signals including the output of an optical scanner system (14) for text and pictures or other graphics and for effecting the storage of such signals in the proper files of a data bank in the computer system (12) and to effect a downloading therefrom to send the information by a modem bank (16) to various designated facilities for disseminating the received information, e.g., for regular TV (18) radio broadcasting (20) and local police agencies (22) medical hospitals (24) internet (26) and thereby to any designated private investigators. Receipt by the mentioned facilities will be to fax machines preferably with data storage or ones incorporated in a computer. The computer system (12) has a first host computer (13) and a second redundant back up computer (15) which communicate along line (17) to maintain identical inputs. Thus they act as back ups should one computer of the system (10) fail.

The locator system (10) has nationwide coverage. The data bank of the computer system (12) will store telecommunication addresses of those to whom information is to be disseminated by the computer system as determined by the file to be disseminated. Preferably the computer system (12) will be able to determine which geographical location is involved. If designating information is beyond a local area and not indicated in the file to be disseminated, as by using caller I.D., or the like. When a registered user of the locator system (10) seeks to initiate a search for a person having a file in the data bank, the user telephones the locator system (10) via input (28) and is validated by validation software (30). An authorized user possesses an account number correlated with the file of the person or item to be found and a Personal Identification Number (PIN). The account number and PIN may be one number to be entered by the caller. When the user telephones the computer the account and pin number must be entered, as by the keys of a touch-tone phone or via voice to a live operator, before the validating software (30) allows entry into the computer system (12) and search information can be disseminated. When a caller is validated by entering the proper pin and account number, the dissemination of information in the file about the lost or missing or that sought is effected.

In the validating mode, the computer is programmed to identify the calling number and to compare it with a residence phone number or other number, in the file to affirm that the location of the search being initiated is in the same local as contemplated when the file was set up. If the number is different, the caller will be transferred to an operator interface (32) to determine the desired national location of the search. There the caller I.D. is used to effect a search in the locality in which the call originates. It is to be understood that the file may include a list of locations to be correlated with the area determined by the caller I.D. number. On validation and dissemination, the caller is then advised by the validation software (30) or a live operator that the information have been disseminated.

Typical organizations to which dissemination may take place are shown on FIG. 1 of the drawings. FIG. 1 illustrates the multiline modem bank (16) disseminating information to various types of organizations of the type to which the information might be disseminated, namely, local TV stations (18), radio stations (20), policy stations (22), the internet (26) and to a private investigator organization or others. It will be noted that the organization may also include those, which in turn disseminate the information to other outlets, which further disseminate the information to the public. For example, broadcasting networks or newspapers. It will be noted that information as to the clothing, to change of hair color or style, etc. of the lost or missing may not be know when the person's computer file is set up. Accordingly, validation software (3) of the computer system (12) is programmed to inquire of the caller if information is to be added to the file and if so to transfer the call to the operator interface (32). The information to be corrected or added is then inputted by the operator interface (30) unless the caller has a fax machine or a computer for inputting the updates. The operator interface (32) will also inquire of the caller, if the caller has information to add, as to adding by fax or computer, and if so, to instruct the caller as to transmitting the information so that it can be added to the file preferably without operator intervention, or only with operator instructional assistance. Such a current update sheet is shown in FIG. 3 as a MISSING PERSON ALERT form wherein the information is illustrative of the type of current information taken by the operator. This ALERT form along with the FIG. 2 application form is then distributed to the agencies and stations mentioned earlier.

The information to be disseminated may include text and photographs to aid the finding of the person or other, which is to be located, as well as any medical or other information. The information may be in a format, which can be downloaded to the computer of the receiving organization ready for broadcast or other display or use without the receiver having to change the format of the information. Dedicated modem lines are used to send information to facilities such as radio stations (20) without graphs since they can't use them and to television broadcast (18) or display with graphics, and another for dissemination to the public by internet (26) including both graphics and text, another modem line for text for a medical facility (24).

The computer system (12) includes both text input and graphics input. The text input is done by the optical scanner (14) for inserting information into the text computer file. The picture input is also done by optical scanner (14) or though a digital or video camera (34) to insert graphics, video, or pictorial information into the computer file.

The system is thus capable of capturing and storing a single digital picture frame or video and text on a computer storage system which features the transmission of this information to a broadcast system over any available communication medium. Stored text and pictorial information will be transmitted using computer communications programs or displayed real-time directly from software for transmission to the appropriate agency for distribution to the filed.

It will be appreciated that the technology integrates high quality text and pictorial information on individuals with the help of the computer system (12). With this technology, information is treated as ordinary digital information. Treated as an (MS DOS) a Data file, text and pictures will be stored, indexed and downloaded to outgoing files on demand. This system provides an economical method for bringing stored information on an individual or object to broadcast distribution channels when a demand is made from an external or internal source.

Optionally attached interfaces allow digital transmission over local area networks, as well as switched and dedicated lines. Selected agencies will be allowed to access and download information on the missing or lost files from the system once a legitimate report is placed and validated by the center.

As an illustrative example of the system and its use, a specific example of the procedure and operation follows:

The locator system (10) of the example utilized a novel approach in the location and rapid distribution of information to locate and retrieve missing individuals or objects. The potential user of the locator system follows the below steps:

1. Fills in an application fact sheet as shown in FIG. 2.
2. Provides a current photograph of the person or item to be located and attaches it to the application form. Photo and Application fact sheet are stored separately at this point or apply 4 below.
3. User identifies at least four (4) emergency locations that are to be immediately notified when the system is activated, i.e. local police, hospital, TV stations, radio stations, Internet, etc.
4. Secondary option for adding the photograph or video of the subscriber through a digital or video camera (34) is, which requires the subscriber to be on, site when the equipment is located.
5. If user requests a satellite locator system (36) the user will acquire a receiving unit that is worn by or attached to the person or item that may become lost or missing.
6. The application form is taken from the user and the data is entered into the system. When the user becomes a caller to the system to initiate a search, the operation is as follows:
    1. The caller dials telephone center (28) from any telephone over the national communications network an 800 or 888 free call number that connects to the locator system (10).
    2. The call is answered and immediately prompts the caller to provide an account number and a personal identification number (PIN) to the validation software (30). The computer system (12) immediately accesses the storage files and performs a validation of the calling number, the PIN and the user file to determine if a correlation exists with the user file.
    3. Upon validating that the request is acceptable, the storage system will access a second file to retrieve the subfiles of the users to retrieve picture of the person to be found and corresponding text file and to pull the pertinent information for the search. The computer then generates a third file called the Alert Form. This form is used by the system or a live operator to take current information about the missing, including direction headed, clothing, frequency of missing calls and any other pertinent information necessary to help with the search. The system then attaches the filed picture or photograph to the Alert Form and retrieves the Application form. Preferably the computer (12) then determines that all files are providing the proper information and then the files are merged to a dissemination document that will be downloaded to a RAM storage bin in a known manner.
    4. A decision tree is implemented at this point to isolate the type of service requested by the user.
        a) if the caller has the satellite retrieval and broadcast of information system (36) the following occurs:
            i) With the satellite retrieval process, the system will incorporate the United States Global Positioning System (CPS) radio or paging system and apply Triangulation techniques to actual locate the lost person. The GPS technology used to determine latitude and longitude of the respective receiver. The uniqueness of the PMC Locator service is the extraction of that information from the GPS receiver. GPS positioning data can be extracted using sideband radio, low earth orbit satellite and geostationary satellites. The locator system (10) computer (12) utilizes two way telephone oriented data links to communicate to the respective satellite uplink and sideband radio terminals. Typically these data links will employ common data communications protocol such as X25 to communicate between computers. Through in house diagnostics, the process will isolate the location of the applicant and send law enforcement to the specified location for rescue purposes. Along with the notification, the system will send out over the modem (16) to the police (22) the lost person application, which incorporates picture and text information that will be necessary to recognize the lost person. Pertinent information on the application will list contact individuals and medical information (if supplied during sign-up) that may be required to safe guard the person to be found.

ii) then the broadcast system is activated. Access of a specifically designed data base will determine the routing procedures for up to (four) multiple locations that the user has previously selected plus a national private investigation service.

iii) a determination will be made by the system to download an optional video commercial, digital picture or picture to local TV stations that have the service. The commercial spot will incorporate the picture of the missing individual and possibly a voice overlay that speaks to the nature of the missing person and circumstances surrounding the case.

iv) Due to the nature of the mobile society, users vacationing and travel opportunities, the system may utilize Automatic Number Identification (ANI) procedures to locate where the incoming calls is originated from, query the user's data base to determine if the call is a home number or is someone calling from a remote location.

v) If the call is from the home location, the system will select the predetermined numbers and broadcast pictorial and text information to the pre-selected locations.

vi) If the call comes in from a remote location, (other than the users home) the ANI information will be used to determine which part of the country the incoming call originated. It is contemplated that when a remote location is to be searched the computer will then, directly or through a main computer, down load the file to a remote computer in that location or a fax machine located at the same location. A reference in the database will be used and the system will notify the in-house operator that special tasks will need to be performed. These tasks include locating the nearest police and emergency services, the local news media, if required, to insert airtime or commercial space, in the local news time slot. The operator will then contact the local police department and any emergency organization associated with the missing persons report.

vii) The system database will then be queried to locate and notify the closest private investigation firm associated with the locator system. Once the identity of the PI firm is made the system will download the pertinent user information to the PI firm.

viii) A return call to the location that has activated the system will preferably be made to notify the individual(s) that their request for service has taken place and that the system has activated the procedures for locating the missing person.

A final notification by the system will be made to all disseminated points once the missing has been found to eliminate the possibility of continued searches of a located missing person or object. The above will apply to vertical product lines such as items like cars etc. as incorporated in the system but will require a clear work definition page.

While many hardware and software requirements are off the shelf technology, the overall system design has never been incorporated to this extent in the prior art to find missing persons or objects. In fact, it is believed that the hardware utilized herein requires it to be specifically arranged to develop the aforementioned functionality of the system.

The hardware components of the system are as follows:
1) Standard domestic United States 800/888 Toll free calling, dialing network for accessing the system.
2) Optical Scanning System
3) Digital, standard print picture and/or Video Cameras
4) Host and Back-Up Computers with massive storage capabilities.
5) Satellite/Radio Links Hardware
6) Modems
7) Back-up power system such as a UPS and generator system
8) Fax Machines or Internal Fax Software
9) Printers Software components:
1) Subscriber fact sheets and Alert form
2) Integrated system with all external interfaces—scanners, digital and video camera systems, Internet
3) Triangulation software
4) Basic system software-interfacing all systems
5) Data base for subscriber picture
6) Data base for subscriber text information
7) Data base for emergency numbers and Private Investigation firms
8) Data base for Automatic Number Identification The system (10) may be easily modified to be also useful in locating
1) user car
2) stolen cars
3) track use or location of rental cars
4) with cellular phones, may be used as security for drivers in trouble. Including activating a satellite or cellular transmission to alert problems and bring into play a full scope of the system if necessary to locate the caller and dispatch police and rescue squads much in the same manner as 911 calls but allowing the person to be tracked by a cellular or satellite locating system.
5) Safe Harbor for children (The child notifies the parent that they have reached the location or home safely. This is accomplished by the child pushing a button on a receiving and transmitting device that signals the parent receiving unit). The operation preferably would utilize the locating system described herein.

It will be understood that certain improvements and modifications will occur to those of ordinary skill in this art area. All such have been deleted herein for the sake of conciseness and readability but are fully intended to fall within the scope of the following claims.

What is claimed is:

1. A locator system for quickly disseminating information to a plurality of agencies to aid in determining the present location of an entity comprising:

a computer system having sufficient memory to retain file data on a great number of different entities;

input means for storing both factual and pictorial data in each file of said entities;

a modem bank connecting said computer system to a plurality of agencies; and an initiation system connected to said computer system to selectively send a particular entities stored file data and a current update of same as of the initiation of the system along said modem bank to said plurality of agencies.

2. A locator system as set forth in claim 1 wherein said input means includes a digital camera, video camera and a textual fact sheet used to provide factual and pictorial information to an optical scan system connected to said computer system to set up an individual data file for a particular entity.

3. A locator system as set forth in claim 1 wherein said initiation system includes a telephonic connection to a validation system for checking the location and identity of said telephonic connector requesting a particular entity data file before initiating the computer system to send said data file to said plurality of agencies.

4. A locator system as set forth in claim 3 wherein said validation system includes means for connecting the telephonic connection to an operator interface for inputting update information into the entity file before said file is disseminated to said agencies.

5. A locator system as set forth in claim 4 wherein said optical scan system connected to said computer system is also connected to said operator interface to provide both factual and pictorial update information for the identified particular entitie's file.

6. A locator system as set forth in claim 5 including a messaging center connected to communicate with said computer system for receiving signals from a GPS receiver located on the identified entity and sending the location corresponding to said receiving signal to said computer system for transmission of the location to said agencies.

7. A locator system as set forth in claim 6 wherein said computer system includes a main host computer and a redundant back-up computer connected to communicate with said host computer to share all data thereby and to take over the function of the host computer should a failure occur therein.

8. A locator system as set forth in claim 7 wherein said agencies include local TV stations, radio stations, police, hospitals, and the internet.

9. A locator system as set forth in claim 8 wherein said computer system controls said modem bank to send appropriate textual and pictorial information to said agencies.

10. A method for quickly disseminating information to a plurality of agencies to aid in locating of an entity comprising the steps of:

inputting textual and pictorial information about the entity into a computer system having sufficient memory to retain this information in individual file data on a great number of different entities;

connecting the computer system to a plurality of agencies that may help in locating the present location of the entity;

initiating the computer system to selectively send a particular entities stored and updated as of the time of initiating the computer system file data along said modem bank to the plurality of agencies.

11. A method for quickly disseminating information to a plurality of agencies to aid in locating of an entity as set forth in claim 10 wherein the step of initiating the computer system includes the steps of identifying the identity of the party initiating the computer system, requesting update information on the current status of the entity from the party initiating the computer system and inputting this update information into the data file of the identified entity prior to disseminating the data file information to the plurality of agencies.

12. A method for quickly disseminating information to a plurality of agencies to aid in locating of an entity as set forth in claim 11 wherein the step of inputting information on the entity includes the step of placing a transmitter on the entity to provide a signal to the computer as to the present location of the entity.

13. A method for quickly disseminating information to a plurality of agencies to aid in locating of an entity as set forth in claim 12 wherein the step of disseminating information to the plurality of agencies includes the disseminating of information as to the present location of the entity.

14. A method for quickly disseminating information to a plurality of agencies to aid in locating of an entity as set forth in claim 13 includes the step of disseminating pictorial, textual and present location information selectively to agencies that are able to utilize the sent information.

15. A method for quickly disseminating information to a plurality of agencies to aid in locating of an entity as set forth in claim 14 including the providing of a pair of computers in the computer system that are able to communicate with each other to share the data of each and to allow one of the to take over the functions of the other if the one computer should fail.

16. A method for quickly disseminating information to a plurality of agencies to aid in locating of an entity as set forth in claim 15 including the steps of setting up a series of computer systems for various regions of the country connected to the local agencies of that part of the country and the step of initiating the computer includes the identification of the region from which the initiating call is originating.

17. A method for quickly disseminating information to a plurality of agencies to aid in locating of an entity as set forth in claim 16 wherein the step of initiating the computer includes the step of sending the data file of the identified entity to the region from which the call is originating for local dissemination to the local agencies.

* * * * *